(12) United States Patent
Zhang

(10) Patent No.: US 10,845,830 B2
(45) Date of Patent: Nov. 24, 2020

(54) INTELLIGENT CONTROL SYSTEM AND CONTROL METHOD FOR DETECTOR, AND PET DEVICE

(71) Applicant: THE WUHAN DIGITAL PET CO., LTD, Hubei (CN)

(72) Inventor: Bo Zhang, Hubei (CN)

(73) Assignee: THE WUHAN DIGITAL PET CO., LTD, Hubei (CN)

( * ) Notice: Subject to any disclaimer, the term of this patent is extended or adjusted under 35 U.S.C. 154(b) by 524 days.

(21) Appl. No.: 15/550,378

(22) PCT Filed: Jan. 23, 2016

(86) PCT No.: PCT/CN2016/071804
§ 371 (c)(1),
(2) Date: Aug. 11, 2017

(87) PCT Pub. No.: WO2016/127779
PCT Pub. Date: Aug. 18, 2016

(65) Prior Publication Data
US 2018/0032094 A1     Feb. 1, 2018

(30) Foreign Application Priority Data

Feb. 13, 2015   (CN) .......................... 2015 1 0080902

(51) Int. Cl.
*G05D 27/02*     (2006.01)
*G01T 1/16*      (2006.01)
(Continued)

(52) U.S. Cl.
CPC .............. *G05D 27/02* (2013.01); *G01T 1/16* (2013.01); *G01T 1/2985* (2013.01); *G01T 7/00* (2013.01);
(Continued)

(58) Field of Classification Search
None
See application file for complete search history.

(56) References Cited

U.S. PATENT DOCUMENTS 5,212,645 A     5/1993  Wildes et al.
10,027,340 B1 * 7/2018  Weisenberger ....... G01T 1/2914
(Continued)

FOREIGN PATENT DOCUMENTS

CN     201017459      2/2008
CN     101198206      6/2008
(Continued)

OTHER PUBLICATIONS

Osprey®—Universal Digital MCA Tube Base for Scintillation Spectrometry, http://canberra.com/products/radiochemistry_lab/pdf/Osprey-SS-C48365.pdf, Mirion Technologies (Canberra), Inc.
(Continued)

*Primary Examiner* — Thomas C Lee
*Assistant Examiner* — Gary Collins
(74) *Attorney, Agent, or Firm* — JCIPRNET

(57) ABSTRACT

An intelligent control system for a detector comprises an external control module (110) and at least one group of data transmission and control modules (120), wherein the external control module (110) is used for controlling packet issuing and feedback message processing; a fifth interface (125) connected to the external control module (110) and used for packet transmission; a processing unit (128); at least one group of first type of interfaces (121) respectively connected to a detector (150) and used for transmitting a control packet of the detector (150); at least one group of second type of interfaces (122) respectively connected to the detector (150) and used for transmitting original data of the detector (150); a data pre-processing unit (129) for acquiring and forwarding the original data or pre-processing data of (Continued)

the detector (150); and a sixth interface (126) connected to the external control module (110) and used for transmitting the original data/pre-processing data of the detector (150). The intelligent control system for a detector can form an intellectualized control platform for performing dynamic configuration, intelligent monitoring, power supply management, data processing, foreign interaction, firmware updating on the detector (150).

20 Claims, 6 Drawing Sheets

(51) Int. Cl.
G01T 7/00 (2006.01)
G01T 1/29 (2006.01)
G05B 19/05 (2006.01)
G05D 22/02 (2006.01)
G05D 23/19 (2006.01)

(52) U.S. Cl.
CPC ............ G01T 7/005 (2013.01); G05B 19/054 (2013.01); G05D 22/02 (2013.01); G05D 23/1917 (2013.01); *G05B 2219/1136* (2013.01); *G05B 2219/15057* (2013.01)

(56) References Cited

U.S. PATENT DOCUMENTS

| | | | | |
|---|---|---|---|---|
| 2003/0031353 A1* | 2/2003 | Baertsch | ................ | A61B 6/00 382/132 |
| 2003/0206609 A1 | 11/2003 | Kling et al. | | |
| 2005/0028014 A1* | 2/2005 | Allred | ................ | H02J 3/14 713/300 |
| 2005/0067578 A1* | 3/2005 | Ueno | ................ | A61B 6/032 250/370.09 |
| 2006/0257011 A1* | 11/2006 | Li | ................ | G06T 11/005 382/131 |
| 2007/0004980 A1 | 1/2007 | Warner et al. | | |
| 2007/0101242 A1* | 5/2007 | Yancey | ................ | G06F 13/4256 714/776 |
| 2008/0011950 A1* | 1/2008 | Rose | ................ | G01T 1/1648 250/339.03 |
| 2008/0181472 A1* | 7/2008 | Doi | ................ | G06T 1/00 382/128 |
| 2009/0114827 A1* | 5/2009 | Burbar | ................ | G01T 1/1603 250/363.09 |
| 2009/0309031 A1* | 12/2009 | Ohtani | ................ | G01T 1/2985 250/363.03 |
| 2010/0188082 A1* | 7/2010 | Morich | ................ | G01R 33/3806 324/307 |
| 2010/0292570 A1* | 11/2010 | Tsukagoshi | ................ | A61B 6/032 600/431 |
| 2011/0215248 A1* | 9/2011 | Lewellen | ................ | A61B 6/037 250/363.03 |
| 2011/0240864 A1* | 10/2011 | Degenhardt | ................ | G01T 1/00 250/362 |
| 2012/0112078 A1* | 5/2012 | Millett | ................ | G01T 1/1612 250/363.03 |
| 2014/0021356 A1* | 1/2014 | Zwaans | ................ | G01T 1/2985 250/362 |
| 2014/0257096 A1* | 9/2014 | Prevrhal | ................ | G01T 1/2985 600/431 |
| 2014/0367577 A1* | 12/2014 | Badawi | ................ | A61B 6/037 250/366 |
| 2016/0206269 A1* | 7/2016 | Jung | ................ | A61B 6/5258 |
| 2017/0164910 A1* | 6/2017 | Cao | ................ | A61B 6/03 |

FOREIGN PATENT DOCUMENTS

| | | |
|---|---|---|
| CN | 201107279 | 8/2008 |
| CN | 103330571 | 10/2013 |
| CN | 104020183 | 9/2014 |
| CN | 104062673 | 9/2014 |
| CN | 104820452 | 8/2015 |
| JP | 2003131708 | 5/2003 |
| JP | 2005523796 | 8/2005 |
| JP | 2005258996 | 9/2005 |
| JP | 2006508760 | 3/2006 |
| JP | 2006167105 | 6/2006 |
| JP | 2006288458 | 10/2006 |
| JP | 2012518784 | 8/2012 |
| KR | 101259826 | 4/2013 |
| WO | 2012095978 | 7/2012 |

OTHER PUBLICATIONS

PCI bus compatible counting board M9003-01, http://www.hamamatsu.com/jp/en/product/category/3100/3004/3050/M9003-01/index.html?_ga=2.38322915.1307577174.1524122857-352388226. 1522719546, Hamamatsu Photonics K.K.

Compact High Voltage Power Supply C4900 Series, http://www.hamamatsu.com/jp/en/product/category/3100/3004/3055/C4900-01/index.html?_ga=2.72412371.1307577174.1524122857-352388226. 1522719546, Hamamatsu Photonics K.K.

HRM-TDC, http://sensl.com/estore/hrm-tdc/, SensL Technologies Ltd.

Full-automatic low background multichannel γ energy spectrometer, Ltd., http://www.hbfyhb.com/products_detail/productId=21.html, Hubei Fangyuan Environmental Protection Science & Technology Co.

"International Search Report (Form PCT/ISA/210) of PCT/CN2016/071804", dated Apr. 26, 2016, with English translation thereof, pp. 1-6.

Office Action of Japan Counterpart Application, with English translation thereof, dated Aug. 21, 2018, pp. 1-9.

* cited by examiner

INTELLIGENT CONTROL SYSTEM AND CONTROL METHOD FOR DETECTOR, AND PET DEVICE

CROSS-REFERENCE TO RELATED APPLICATION

This application is a 371 application of International PCT application serial no. PCT/CN2016/071804, filed on Jan. 23, 2016, which claims the priority benefit of China application no. 201510080902.5, filed on Feb. 13, 2015. The entirety of each of the abovementioned patent applications is hereby incorporated by reference herein and made a part of this specification.

TECHNICAL FIELD

The present disclosure relates generally to the technical field of data processing, and more particularly, to a control device for data acquisition of a PET (Positron Emission Computed Tomography) device.

BACKGROUND

The nuclear detector is more and more popular in daily applications vital to the people's livelihood, and has been developing rapidly in areas of inspection and quarantine, environmental protection and healthcare. As a basic unit for ray detection, the nuclear detector is able to perform qualitative or quantitative detection on various ionizing rays in daily applications, for example, X ray used in a level indicator, α or β ray used in water quality detection and monitoring, X-ray used in medical CT, γ ray used in PET, X, γ or neutron ray used in environment radiation background level detection.

The digitization and modularization of the nuclear detector are the most popular development trends. A high-energy ray can be gradually converted to be quantifiable with a certain ray detection module converting the energy of the ray effectively. The electrical signal capable of being digitizable is a common trend in the development of the nuclear detector, but it subjects to different application fields, so the device developers need to build a data acquisition system and a control system around the modularized detector.

CANBERRA Co. has many product lines in the area of nuclear detector, and has developed a universal digitized control module multichannel analyzer—OSPREY for different types of detectors. The OSPREY is based on DSP techniques, adaptable for a NaI detector, a LaBr3 detector or a high purity Germanium detector, and able to provide options of positive and negative high voltages required by the detector. The multichannel analyzer integrates a series of useful functions, such as energy spectrum analysis and automatic gain adjustment, and is the most mature and popular application of the controller of the nuclear detector in the area of energy spectrum measurement.

HAMAMATSU Co. focuses on critical components and special modules of the nuclear detector. For a specific detector, HAMAMATSU Co. has developed separate power module and application module, by testing the performance of the detector, and programming parameters into a specific module. For example, in the area of the counting of the nuclear detector, M9001-03 was developed based on a counting module card of PCI and a high-voltage module of C499-01. HAMAMATSU Co. is trying to achieve the configuration, control and application for any nuclear detector by a combination of various components.

SensL Co. has introduced HRM-TDC directed to the nuclear detector made up of its silicon photomultiplier (SiPM). The HRM-TDC is used for processing multichannel data of the detector, and includes a TDC internally, capable of achieving the measurement of time related to the nuclear detector and the application of travelling time. The TDC has been able to make a measurement with a time precision of 27 ps.

Hubei Fangyuan Environmental Protection Science & Technology Ltd. Enjoys a leading position in nuclear instruments, such as energy dispersive spectrometers and αβ measuring instruments, in Chinese market. This company has introduced a FYFS-2002F integrated controller with a series of functions for nuclear detector, such as high voltage supply, correction, energy spectrum statistics, and data preprocessing, capable of fitting many types of nuclear detectors. This company is developing a supper-multichannel nuclear detector controller based on FPGA, and is trying to achieve access of multiple detectors by a common platform. At present, an access combination control for 8 channels and 10 detectors has been implemented on a α/β counter.

However, both medical radiation detectors and environment monitoring and detecting nuclear detectors employ a combined design of the detector and the control module, in which a special electronic circuit and an embedded software system are integrated to achieve the supply and function of the detector. The current detectors are unable to provide an integrated solution to address the following problems.

(1) The power supply of the detector is unable to be supplied by an intelligent configuration, and to be monitored.

(2) The data1 output from the detector is transmitted passively all the time, without active control.

(3) The detector is unable to be upgraded dynamically.

(4) It is difficult to manage and maintain an array detector, because the star global clock network of array detector faces challenges from complicated and high-precision data wiring in practice.

SUMMARY OF THE DISCLOSURE

An objective of the present disclosure is to provide an intelligent control module and control method for a detector, which can package the detector independently, to network the control of the detector and modularize the data of the detector, and to provide a unified external interface, so that it can have a thorough understanding of information of the detector to ensure the normal operating condition of the detector, and it can configure the parameters of the detector adaptively and process data according to applications, that is, the basic detector unit is applicable to applications in different areas by upgrading the firmware online.

In order to achieve the above objective, the following solutions are provided herein.

An intelligent control system for a detector is provided, including an external control module and at least one data transmission and control module communicated to the external control module respectively, wherein:

the external control module is communicatively connected with each data transmission and control module respectively to be configured to transmit control messages to the detector and the data transmission and control module, and receive and process feedback messages from the detector and the data transmission and control module, and original data or preprocessed data of the detector transmitted by the data transmission and control module;

each data transmission and control module includes a processing unit, a data preprocessing unit, at least one first-type interface, at least one second-type interface, a fifth-type interface and a sixth-type interface;

the fifth-type interface is communicatively connected with the external control module, and configured to transmit the control messages and the feedback messages of the detector and the data transmission and control module;

the processing unit is configured to receive, parse, process, and transmit the control messages of the detector and the data transmission and control module;

the at least one first-type interface is coupled to a plurality of detectors, and configured for the transmission of the control messages and the feedback messages of the detector;

the at least one second-type interface is coupled to the plurality of detectors, and configured for the transmission of the;

the data preprocessing unit is configured to acquire, receive and transmit the original data of the detector, or the data preprocessing unit is configured to acquire, receive a d preprocess the original data of the detector and transmit the preprocessed data of the detector; and the sixth-type interface is communicatively connected with the external control module, and configured for the transmission of the original data of the detector or the preprocessed data of the detector.

The intelligent control system further includes at least one operating condition monitoring and control module and/or operating environment monitoring module for the detector and/or the data transmission and control module, the data transmission and control module is provided with at least one third-type interface, the at least one third-type interface is a reserved control interface, and each data transmission and control module is communicatively connected with one operating condition monitoring and control module and/or operating environment monitoring module through the third-type interface.

The operating condition monitoring and control module is a fan monitoring and control module or a power supply monitoring and control module, or a combination of both: one end of the power supply monitoring and control module is communicatively connected with a power supply of the detector and/or the data transmission and control module, and the other end of the power supply monitoring and control module is coupled to the data transmission and control module through one third-type interface to be driven by the intelligent control system to configure output parameters of the power supply dynamically, the output parameters of the power supply including voltage, current and power; and one end of the fan monitoring and control module is communicatively connected with a plurality of fans, and the end other of the fan monitoring and control module is coupled to the data transmission and control module through one third-type interface to be driven by the intelligent control system to adjust rotational speeds of the plurality of fans respectively; and the operating environment monitoring module is an operating temperature monitoring module or an environment humidity monitoring module, or a combination of both: one end of the operating temperature monitoring module is communicatively connected with a temperature sensing unit, and the other end of the operating temperature monitoring module is coupled to the data transmission and control module through one third-type interface to monitor operating temperature information of the detector and/or the data transmission and control module in real time; and one end of the environment humidity monitoring module is communicatively connected with a humidity sensing unit, and the other end of the environment humidity monitoring module is coupled to the data transmission and control module through one third-type interface to monitor humidity information of an operating environment where the detector and/or the data transmission and control module is in real time.

The number of the first-type interfaces and the number of the second-type interfaces correspond to the number of the plurality of detectors respectively, and each detector is communicatively connected with the data transmission and control module through one first-type interface and one second-type interface respectively;

preferably, the data transmission and control module further includes an ID determination unit communicatively connected with the external control module through the fifth-type interface, and the ID determination unit is configured to inform and determine an ID of the data transmission and control module; and preferably, the data preprocessing unit is configured to perform a preprocessing step between acquisition and transmission, and the preprocessing step includes one or more of screening, filtering, algorithm implementation, marking, encapsulation, packetization, caching and packet sending.

The processing unit is a first controller for parameter configuration and firmware upgrade, the data preprocessing unit is a second controller for data interaction among a plurality of detectors, the fifth-type interface and the at least one first-type interface are provided on the first controller, the sixth-type interface and the at least one second-type interface are provided on the second controller, and the third-type interface is provided on the first controller or the second controller.

The first controller and/or the second controller is provided with a seventh-type interface, and the seventh-type interface is a peripheral expansion interface coupled to a peripheral control unit, and configured for expansion of RAM and FLASH for the first controller and/or the second controller;

preferably, a fourth-type interface is provided between the first controller and the second controller, for data interaction between the first controller and the second controller; and preferably, the first controller and the second controller include a micro control unit (MCU), a digital signal processor (DSP), a complex programmable logic device (CPLD), and a field-programmable gate array (FPGA).

The second controller is a FPGA, the first controller is communicatively connected with the FPGA through a fourth-type interface, the fourth-type interface includes a J401 interface and a J402 interface, the J401 interface is configured for transmission of firmware configuration data between the first controller and the FPGA, and the J402 interface is configured for transmission of transaction data between the first controller and the FPGA;

preferably, the J401 interface is a PS mode configuration interface, the J402 interface is a short distance data transmission interface, the short distance data transmission interface is any one of a RS232 interface, a serial peripheral interface (SPI), an inter-integrated circuit (I2C), a general purpose input output (GPIO), a flexible static memory controller (FSMC), an embedded panel interface (EPI), and a local bus; and preferably, the first controller is an MCU.

The first-type interface, the second-type interface, the third-type interface, the fifth-type interface and the sixth-type interface include a RS232 interface, a RS485 interface, an Ethernet interface; a CAN interface, a fiber interface, SPI, I2C, GPIO, and FSMC;

the external control module include a control display unit, and at least one device access unit communicatively connected with the control display unit;

the control display unit includes a message storage and transmission part for the detector and the data transmission and control module, a performance and environmental parameter configuration part for the detector and/or the data transmission and control module, a performance and operating condition parameter configuration part for the detector and/or the data transmission and control module, and a data processing part for processing, analyzing and storing the original data or preprocessed data of the detector;

the message storage and transmission part is communicatively connected with the fifth-type interface of each data transmission and control module through the device access unit, and configured to query and configure parameters of the detector, and upgrade firmware of the detector and the data transmission and control module;

the performance and environmental parameter configuration part is communicatively connected with the fifth-type interface of each data transmission and control module through the device access unit, and configured to configure operating parameters of the detector and/or data transmission and control module dynamically;

the performance and operating condition parameter configuration part is communicatively connected with the fifth-type interface of each data transmission and control module through the device access unit, and configured to configure operating parameters of the detector and/or data transmission and control module, and operating parameters of the operating condition monitoring and control module dynamically; and the data processing part is communicatively connected with the sixth-type interface of each data transmission and control module, and configured for data post-processing of the original data and the preprocessed data of the plurality of detectors, including data storage, calculation, processing, transmission and image reconstruction.

The control display unit and the at least one device access unit, a plurality of device access units, and the at least one device access unit and the data transmission and control module are coupled together through a full-featured IP communication; and the control display unit is coupled to the at least one device access unit through a full-featured IP communication, the plurality of device access units are coupled to one another through a full-featured IP communication, and the device access unit is coupled to the data transmission and control module through a CAN bus communication.

The control display unit is provided a third controller and a fourth controller separately, the third controller includes a message storage and transmission part, a performance and environmental parameter configuration part, and a performance and operating condition parameter configuration part, and the fourth controller includes the data processing part.

A control method for an intelligent control system for a detector is provided, including:

(1) initialization and self-checking, wherein the external control module drives the data transmission and control module to perform initialization and self-checking, after receiving an initial instruction, and data from the plurality of detectors is acquired and preprocessed by the data preprocessing unit, and transmitted to a data processing part of the external control module through the sixth-type interface;

the initialization and self-checking in the step (1) includes: after powering up the data transmission and control module, (1-1) configuring, by a processing unit, clocks and peripherals of the data transmission and control module independently;

(1-2) loading, by a data preprocessing unit, a data processing program;

(1-3) configuring and detecting, by the processing unit, an operating voltage of the detector to successfully power up the detector, the processing unit configuring initial operating parameters of the detector so that the detector begins to operate and transmit data; and (1-4) transmitting, data from the plurality of detectors, to the data processing part of the external control module through the sixth-type interface, after being acquired and preprocessed by the data preprocessing unit; and (2) monitoring and determining, by the external control module, a control instruction input by the operator in real time, wherein:

(2-1) if the control instruction is determined to be an inquiry instruction for a parameter of a specified detector, the external control module transmits the inquiry instruction to the data transmission and control module through the fifth-type interface, the data transmission and control module queries the parameter of the specified detector through a first-type interface communicatively connected with the specified detector after receiving and processing the inquiry instruction, and the data transmission and control module feeds back information on the parameter to the external control module to display and process;

(2-2) if the control instruction is determined to be an instruction to configure a parameter of a specified detector, the external control module transmits information on the parameter of the specified detector to the data transmission and control module through the fifth-type interface, the data transmission and control module downloads and transmits the information on the parameter to the specified detector through a first-type interface communicatively connected with the specified detector, and the specified detector configures the parameter based on the information on the parameter;

(2-3) if the control instruction is determined to be an instruction to upgrade firmware of a specified detector, the external control module packages and transmits a firmware upgrade program for the specified detector to the data transmission and control module through the fifth-type interface, and the data transmission and control module configures the firmware upgrade program to the specified detector through a first-type interface communicatively connected with the specified detector; and (2-4) if the control instruction is determined to be an instruction to upgrade firmware of the data transmission and control module, the external control module packages and transmits a firmware upgrade program for the data transmission and control module to the data transmission and control module through the fifth-type interface, and data transmission and control module downloads and configures the firmware upgrade program for the data transmission and control module.

In the step (2-4), the external control module transmitting the firmware upgrade program for the data transmission and control module through the fifth-type interface includes:

(2-4-1) if the external control module determines the control instruction is a firmware upgrade instruction for a first controller, the external control module transmits messages about a firmware upgrade program for the first controller and the firmware upgrade instruction for the first controller to the first controller through a fifth-type interface, and the first controller downloads and configures the firmware upgrade program for the first controller after receiving and analyzing the messages; and (2-4-2') if the external control module determines the control instruction is a firmware upgrade instruction for a second controller, the external control module transmits message about a firmware upgrade program for the second controller and the firmware upgrade instruction for the second controller to the first controller through a fifth-type interface, and the first controller downloads the firmware upgrade program for the second controller after receiving and analyzing these messages, and transmits the firmware upgrade program for the second controller to the second controller for configuration through the J401 interface;

alternatively, in the step (2-4), it includes: (2-4-1') if the external control module determines the control instruction is a firmware upgrade instruction for a first controller, the external control module transmits a firmware upgrade program for the first controller to the first controller through a fifth-type interface, and the first controller downloads and configures the firmware upgrade program for the first controller; and (2-4-2') if the external control module determines the control instruction is a firmware upgrade instruction for a second controller, the external control module transmits a firmware upgrade program for the second controller to the second controller through a sixth-type interface, and the second controller downloads and configures the firmware upgrade program for the second controller; and the control method for the intelligent control system further includes a step (3) of monitoring and processing operating condition of the detector and/or the data transmission and control module, including: receiving, by the data transmission and control module in real time through the third-type interface, data of real-time parameters of the operating condition of the detector and/or the data transmission and control module transmitted by the operating condition monitoring and control module, and transmitting the data to a performance and operating condition parameter configuration part of the external control module through the fifth-type interface, the performance and operating condition parameter configuration part configuring operating parameters of the detector and/or the data transmission and control module dynamically based on performance and parameter models of the detector and/or the data transmission and control module, or the performance and operating condition parameter configuration part driving the operating condition monitoring and control module to adjust operating parameter of a device to be monitored, so that the detector and/or the data transmission and control module is in an optimum operating condition.

The control method for the intelligent control system further includes a step (4) of monitoring and processing operating environment condition of the detector and/or the data transmission and control module, including: receiving, by the data transmission and control module in real time through the third-type interface, data of real-time parameters of the operating environment of the detector and/or the data transmission and control module transmitted by the operating environment monitoring module, and transmitting the data to a performance and environment parameter configuration part of the external control module through the fifth-type interface, the performance and environment parameter configuration part configuring operating parameters of the detector and/or the data transmission and control module dynamically based on performance and parameter models of the detector and/or the data transmission and control module dynamically, so that the detector and/or the data transmission and control module is in an optimum operating condition.

A PET device is further provided herein, including a detector, an intelligent control system for the detector, and auxiliary systems including a calibration system, a machine position control system, and a power distribution system, wherein the calibration system, the machine position control system, and the power distribution system are communicatively connected with the external control module respectively to be driven by the external control module to operate, each data transmission and control module is communicatively connected with a plurality of detectors through a first-type interface and a second-type interface respectively to control each detector, and acquire and transmit original data of each detector.

Due to the above solutions, the present invention has the following advantageous effects.

Compared with traditional, application-specific controllers, the intelligent control systems provided in the present disclosure has the following advantages.

1. The intelligent control system according to the present disclosure can use a programmable, customizable algorithm center as a data preprocessing platform. Each traditional nuclear detector generally has a controller only with a data transmission function or a fixed data processing mode. For example, in a PET detector, the controller may be only capable of transmitting data or selecting an energy window or a time window, while in an energy spectrum detector, the controller may make multi-channel energy spectrum analysis. The intelligent control system according to the present disclosure can provide various algorithm implementations according to user needs, and can also provide a user-customizable algorithm platform. In the intelligent control system, all data processing can be performed in a real-time mode or a delay controllable mode based on a second controller, such as FPGA.

2. The intelligent control system according to the present disclosure can optimize the configuration of the detector, monitor the detector in real time, and optimize the performance of the detector. Each traditional nuclear detector generally has a controller with fixed configuration parameters including voltage, gain and threshold. The intelligent control system according to the present disclosure can record and analyze operating conditions of the detector, and obtain an optimal operating condition for the detector through big data analysis, to propose an optimal configuration file to configure the detector. Meanwhile, this intelligent control system can monitor the environmental parameters of the detector in real time, and change the configuration parameters of the detector and intelligent control system dynamically based on a model of the performance and the environmental parameters and a model of the performance and the operating parameters, so that both the detector and the intelligent control system are always in optimal operating conditions.

3. The intelligent control system according to the present disclosure can achieve on-line management, and on-line firmware upgrade and maintenance. The traditional detector generally has a control module only corresponding to one detector, with a fixed operating mode, a fixed processing flow, and an offline management mode. The intelligent control system according to the present disclosure can combine the CAN bus and Ethernet network to build a All-IP management architecture, so that all the detectors are intelligently modularized into separate on-line units. Through a centralized-control center, the user can access, control, and interact with an intelligent module of the detector, collect and acquire state information of the detector, record and analyze local data, and download and update firmware to change the function and process of the detector for different applications.

DETAILED DESCRIPTION

The present invention will be further described by reference to the following embodiments taken in conjunction with the accompanying drawings.

Figure 1:
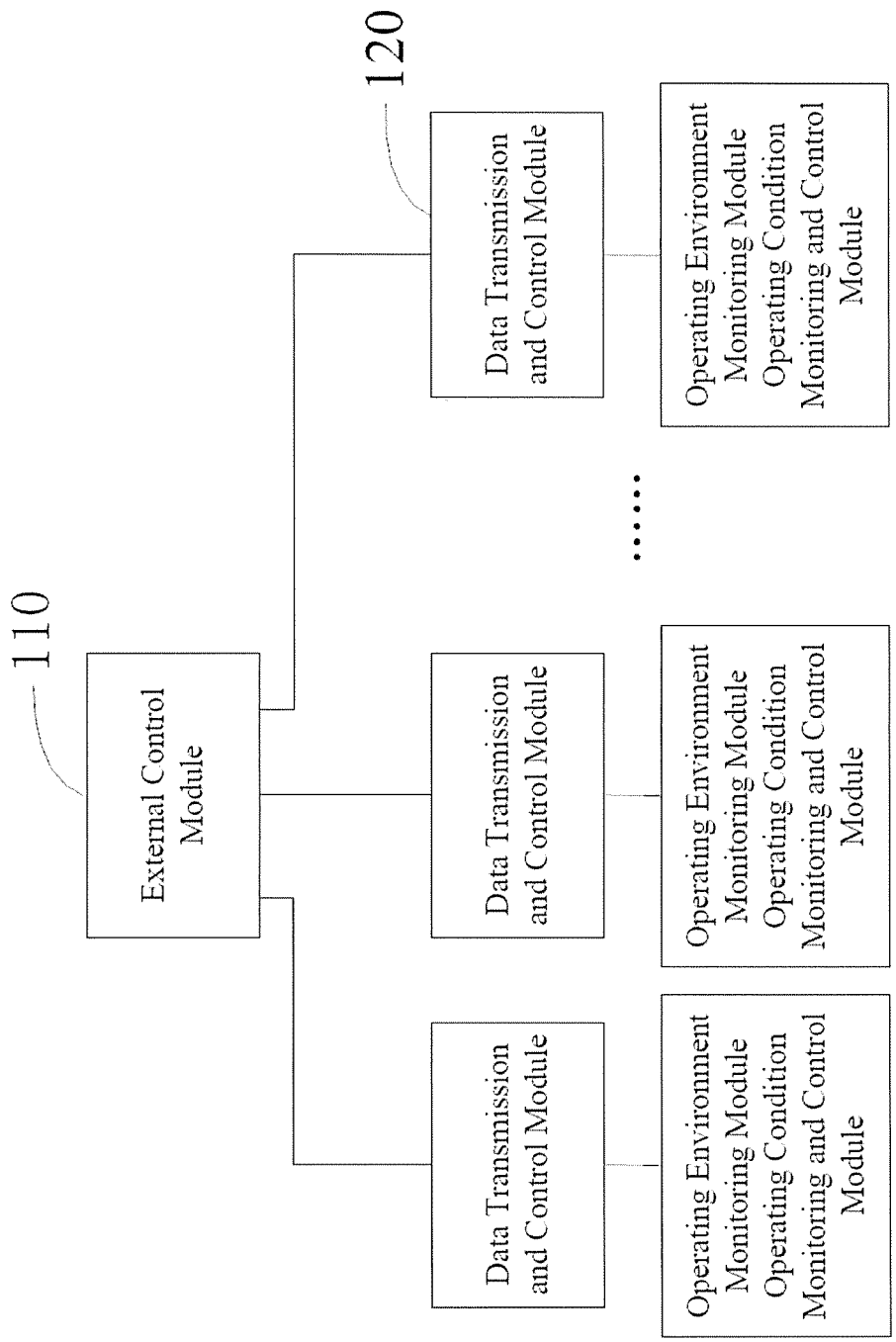
FIG. 1 is a schematic diagram illustrating a totally connected network of an intelligent control system for a detector according to a first embodiment of the present disclosure.
Figure 2:
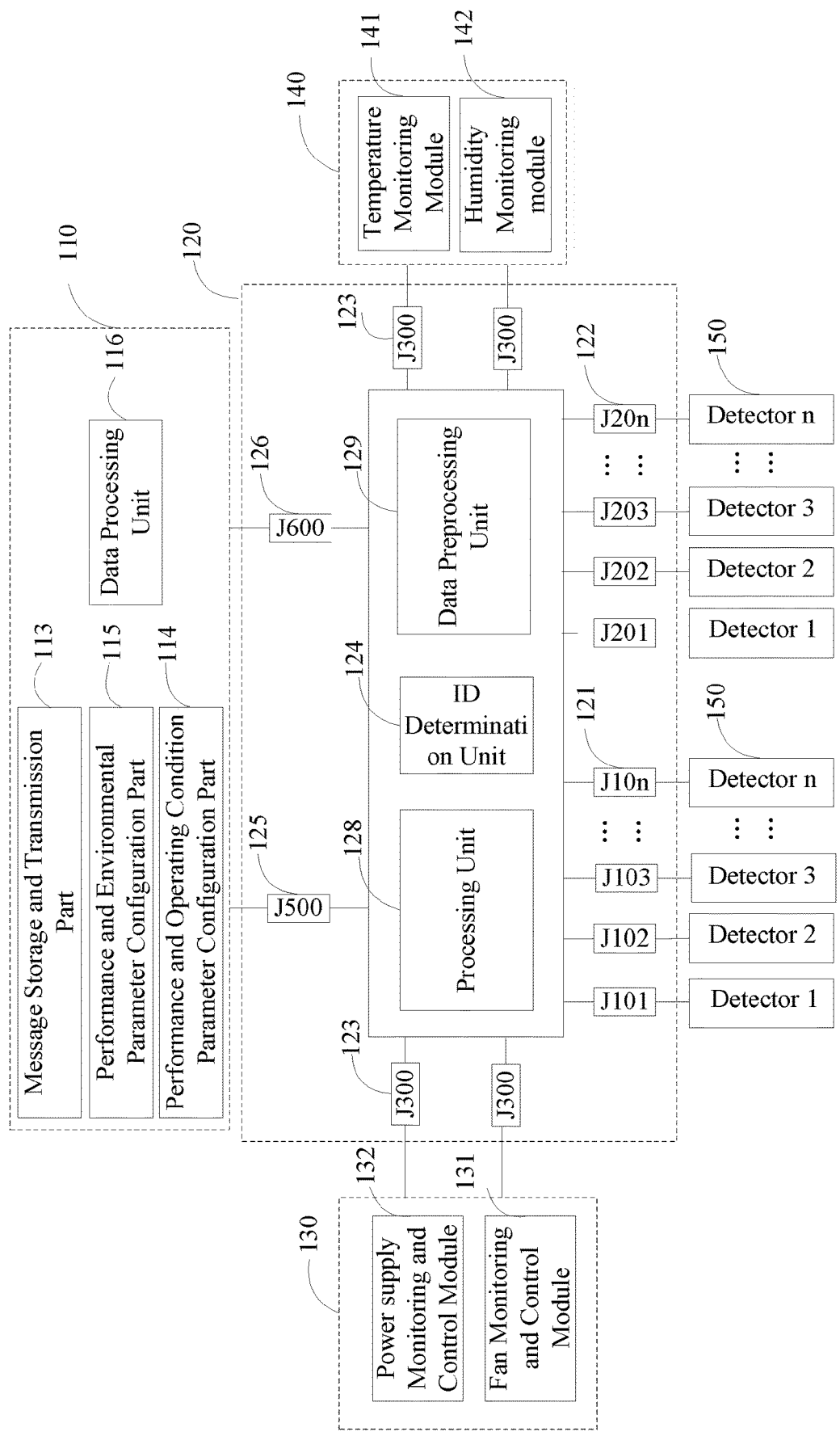
FIG. 2 is a structural schematic diagram illustrating the embodiment in FIG. 1.
Figure 3:
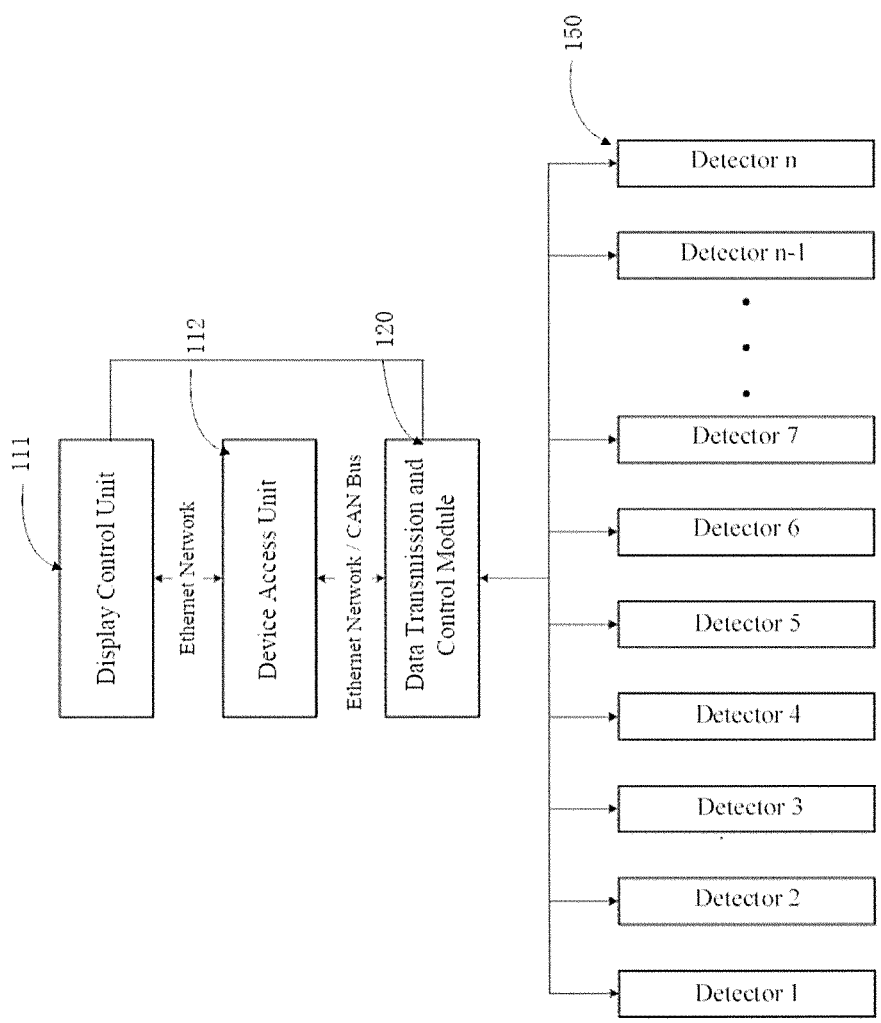
FIG. 3 is a schematic diagram illustrating communication connection relations of the embodiment in FIG. 1.

In a first embodiment, as shown in FIGS. 1-3, an intelligent control system for a detector is provided, including an external control module 110, and at least one group of a data transmission and control module 120, an operating condition monitoring and control module 130 and an operating environment monitoring module 140.

The external control module 110 is configured to transmit control messages to the detector 150 and the data transmission and control module 120, and receive and process original data/preprocessed data of the detector and feedback messages transmitted by the data transmission and control module. The external control module 110 includes a control display unit 111 and a device access unit 112 communicatively connected with the control display unit 111.

In this embodiment, the control display unit 111 is in an integrated structure including a message storage and transmission part 113, a performance and environmental parameter configuration part 114, a performance and operating condition parameter configuration part 115 and a data processing part 116. The message storage and transmission part 113 is configured to control the upgrade and parameter configuration of the detector 150 and the data transmission and control module 120. The performance and environmental parameter configuration part 114 and the performance and operating condition parameter configuration part 115 are configured to configure the detector 150 and the data transmission and control module 120 dynamically. The data processing part 116 is configured to process the original data or preprocessed data of the detector transmitted by the data transmission and control module 120, including data storage, calculation, processing, transmission, image reconstruction and other operations. The device access unit 112 is communicatively connected with the control display unit 111 through an IP network, the device access unit 112 is communicatively connected with the data transmission and control module 120 through an IP network or CAN bus, to achieve information transmission, buffering and transformation between the data transmission and control module 120 and the control display unit 111.

With this kind of communication architecture, each device in the intelligent control system can be communicated to one another based on IP or CAN communication. As a standard component in the operating system, the IP and CAN communication is well-arranged with stable and clear external interfaces, so that the whole system has high reliability, low cost and strong commonality in data processing and transmission. In addition, the system has a strong expandability, so that a new data transmission and control module can be added to achieve the accessing and control of a new detector, without changing the overall framework of the system.

Each data transmission and control module 120 is coupled to a plurality of detectors, and includes a processing unit 128, a data preprocessing unit 129, an ID determination unit 124, at least one first-type interface 121, at least one second-type interface 122, at least one third-type interface 123, one fifth-type interface 125 and one sixth-type interface 126. With the data transmission and control module 120, the transmission and control of the data can be separated into two independent paths.

The first-type interface 121, the second-type interface 122, the third-type interface 123, the fifth-type interface 125 and the sixth-type interface 126 may be selected from any one of RS232 interface, RS485 interface, Ethernet interface, CAN interface, fiber Interface, SPI, I2C, GPIO and FSMC. In this embodiment, the fifth-type interface 125 and the sixth-type interface 126 is in IP or CAN communication with the external control module 110, so the fifth-type interface 125 and the sixth-type interface 126 are Ethernet interfaces or CAN interfaces.

Data Control

The at least one first-type interface 121 is coupled to a plurality of detectors 150 respectively, and configured for the transmission of the control messages and the feedback messages of the plurality of detectors 150 coupled to the data transmission and control module 120. The fifth-type interface 125 is communicatively connected with the external control module 110, and configured to transmit the control messages and the feedback messages of the plurality of detectors 150 and the data transmission and control module 120. In this embodiment, the fifth-type interface 125 is communicatively connected with the message storage and transmission part 113 through the device access unit 112, and is configured to query and configure parameters of the detector 150, and upgrade firmware of the detector 150 and the data transmission and control module 120. The number of the first-type interface 121 is set correspondingly to the number of the plurality of detectors 150 coupled to the data transmission and control module 120. Each detector 150 is communicatively connected with the data transmission and control module 120 through one first-type interface 121. The fifth-type interface 125 is an Ethernet interface. The processing unit 128 is configured to parse and process the control messages of the detector 150 and the data transmission and control module transmitted through the fifth-type interface 125, and feed back the information on the detector 150 and the data transmission and control module.

Data Transmission

The at least one second-type interface 122 is coupled to the plurality of detectors 150 respectively, and configured for the transmission of original data of the detectors 150. The sixth-type interface 126 is communicatively connected with the external control module 110, and configured for the transmission of original data/preprocessed data of the detector 150. In this embodiment, the number of the second-type interface 122 is set correspondingly to the number of the plurality of detectors 150. Each detector 150 is communicatively connected with the data transmission and control module 120 through one second-type interface 122. The data preprocessing unit 129 is configured to receive, acquire and transmit the original data of the detector 150, or is configured to receive, acquire and preprocess the original data of the detector 150 and transmit the preprocessed data. The data preprocessing unit 129 performs a preprocessing step between acquisition and transmission, and the preprocessing step includes one or more of screening, filtering, algorithm implementation, marking, encapsulation, packetization, caching and packet sending. The sixth-type interface 126 is an Ethernet interface. The sixth-type interface 126 of each data transmission and control module is communicatively connected with the data processing part 116 directly, to process the original data or preprocessed data of the plurality of detectors 150.

The ID determination unit 124 is communicatively connected with the external control module 110 through the fifth-type interface 125, and is configured to inform and determine an ID of the data transmission and control module 120 to the external control module 110. The external control module 110 is coupled to many data transmission and control modules, so each data transmission and control module is provided with an ID determination unit 124 to prevent information from being transmitted improperly.

The at least one third-type interface 123 is a reserved control interface, and configured for the access and processing of the operating condition monitoring and control module 130 and the operating environment monitoring module 140.

The operating condition monitoring and control module 130 is configured to monitor operating condition parameters of the detector 150 and the data transmission and control module 120, and transmit the operating condition parameters to the data transmission and control module 120. The fifth-type interface of the data transmission and control module 120 is communicatively connected with the performance and operating condition parameter configuration part 115 to configure the operating parameters of the detector 150 and the data transmission and control module 120 dynamically, or drive the operating condition monitoring and control module 130 to adjust the operating condition of the device to be monitored, so that both the detector 150 and the data transmission and control module 120 are in optimum operating conditions. In this embodiment, the operating condition monitoring and control module includes a fan monitoring and control module 131 or a power supply monitoring and control module 132, or a combination of both.

One end of the fan monitoring and control module 131 is communicatively connected with a plurality of fans, and the end other of the fan monitoring and control module 131 is coupled to the data transmission and control module (processing unit 129) through one third-type interface to be driven by the intelligent control system to adjust rotational speeds of the plurality of fans respectively, so that the operating temperatures of the detector 150 and the data transmission and control module 120 are adjustable. When the intelligent control system, i.e., the performance and operating condition parameter configuration part 115 determines that the operating temperature of the detector 150 is too high, a control instruction may be transmitted to increase the rotational speeds of the fans, and when the performance and operating condition parameter configuration part 115 determines that the operating temperature of the detector 150 is too low, a control instruction may be transmitted to decrease the rotational speeds of the fans. If the data transmission and control module 120 has a sufficiently powerful function, the performance and operating condition parameter configuration part 115 may also be provided in the data transmission and control module 120.

One end of the power supply monitoring and control module 132 is coupled to a power supply of the detector 150 or the data transmission and control module 120, and the other end of the power supply monitoring and control module 132 is coupled to the data transmission and control module (processing unit 128) through one third-type interface to be driven by the intelligent control system to configure output parameters of the power supply dynamically, the output parameters of the power supply including voltage, current and power. The intelligent control system, i.e., the performance and operating condition parameter configuration part 115 receives the real time operating voltage, current and power outputs of the detector 150 and the data transmission and control module 120 transmitted by the power supply monitoring and control module 132 through the fifth-type interface. If the performance and operating condition parameter configuration part 115 determines that one output is abnormal, it may transmit a control instruction to the power supply monitoring and control module 132. The power supply monitoring and control module 132 may analyze the control instruction, and adjust the output of the power supply of the detector 150 and the data transmission and control module 120, so that the operation of the detector 150 and the data transmission and control module 120 is in a normal condition.

The operating environment monitoring module 140 is configured to monitor the operating environment parameters of the detector 150 and the data transmission and control module 120 in real time, and transmit the real time operating environment parameters to the data transmission and control module 120 (processing unit 128) through the third-type interface. The fifth-type interface of the data transmission and control module 120 is communicatively connected with the performance and operating condition parameter configuration part 115 through the device access unit 112, to timely warn the operator to process the abnormal condition of the environment parameter, so that the detector 150 and/or the data transmission and control module 120 are always in optimum operating conditions. In this embodiment, the operating environment monitoring module 140 includes an operating temperature monitoring module 141 or an environment humidity monitoring module 142, or a combination of both.

One end of the operating temperature monitoring module 141 is communicatively connected with a temperature sensing unit for receiving temperature data transmitted by the temperature sensing unit, and the other end of the operating temperature monitoring module 141 is coupled to the data transmission and control module 120 through one third-type interface to transmit the monitored operating temperature information of the detector 150 or the data transmission and control module 120 to the performance and operating condition parameter configuration part 115 through the data transmission module in real time. The temperature sensing unit may be a sensor. One end of the environment humidity monitoring module 142 is coupled to a humidity sensing unit, and the other end of the environment humidity monitoring module 142 is coupled to the data transmission and control module 120 through one third-type interface 123 to monitor humidity information of an operating environment where the detector 150 or the data transmission and control module 120 is in real time.

The intelligent control system in the first embodiment can provide power configuration, power management, operating condition monitoring and reporting, parameter configuration, and performance correction for the normal operation of the detector 150 and the data transmission and control module 120, to achieve full monitoring of the detector 150.

Figure 6:
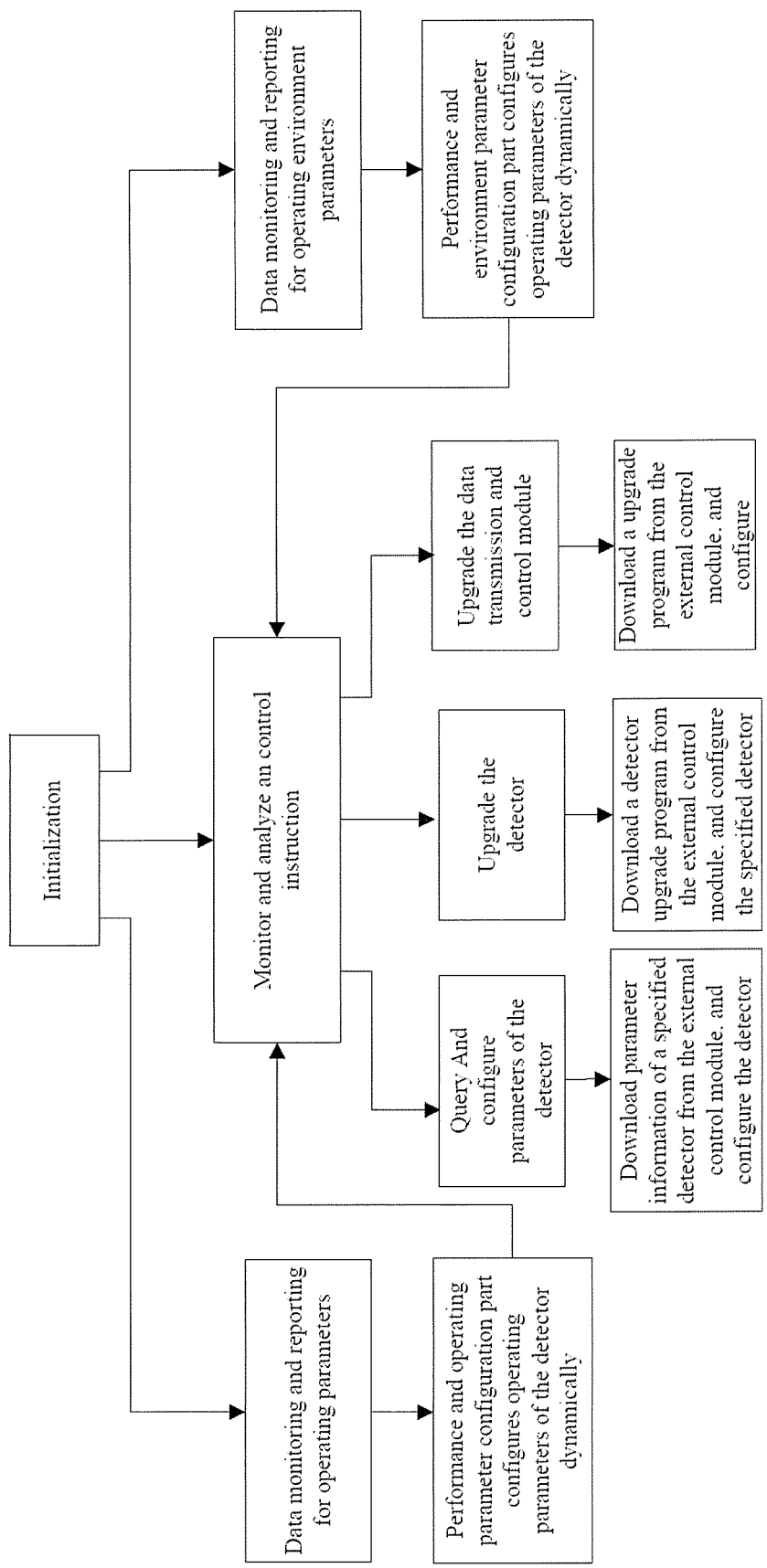
FIG. 6 is a schematic diagram illustrating operating processes of an intelligent control system for a detector according to the present disclosure.

As shown in FIG. 6, a control method for the intelligent control system in the first embodiment is provided, including the following steps:

(1) initialization and self-checking, wherein the message storage and transmission part 113 of the external control module 110 drives the data transmission and control module 120 to perform initialization and self-checking, after receiving an initial instruction, and when the initialization is successful, the data processing unit begins to acquire and preprocess the original data of the plurality of detectors 150 through the second-type interface, and the data preprocessing unit transmits the preprocessed original data to the data processing part of the external control module 110 through the sixth-type interface, for image reconstruction;

the initialization and self-checking in the step (1) includes: after powering up the data transmission and control module 120, (1-1) configuring, by a processing unit 128, clocks and peripherals of the data transmission and control module independently;

(1-2) loading, by a data preprocessing unit 129, a data preprocessing program for subsequent data acquisition of the plurality of detectors 150;

(1-3) configuring and detecting, by the processing unit 128, an operating voltage of the detector 150 to successfully power up the detector 150 after the data preprocessing unit 129 has completed the loading, the processing unit 128 continuing to configure initial operating parameters of the detector 150 so that the detector 150 begins to operate and transmit data; and (1-4) transmitting, data from the plurality of detectors 150, to the data processing part of the external control module 110 through the sixth-type interface, after being acquired and preprocessed by the data preprocessing unit.

(2) During the acquisition and transmission of the data of the detector 150, the external control module 110 monitors and determines the control instruction input by the operator in real time, to timely adjust the detector 150 or the data transmission and control module 120.

(2-1) If the control instruction is determined to be an inquiry instruction for a parameter of a specified detector 150, the message storage and transmission part 113 of the external control module 110 transmits the inquiry instruction to the data transmission and control module 120 (processing unit 128) through the fifth-type interface, the data transmission and control module (processing unit 128) queries the parameter of the specified detector 150 through the first-type interface 121 communicatively connected with the specified detector 150 after receiving the inquiry instruction, and the data transmission and control module 120 feeds back information on the parameter to the external control module 110 to display and process.

(2-2) If the control instruction is determined to be an instruction to configure a parameter of a specified detector 150, the external control module 110 (message storage and transmission part 113) transmits information on the parameter of the specified detector 150 to the data transmission and control module (processing unit 128) through the fifth-type interface, the data transmission and control module downloads and transmits the information on the parameter to the specified detector 150 through a first-type interface communicatively connected with the specified detector 150, and the specified detector 150 configures the parameter based on the information on the parameter.

(2-3) If the control instruction is determined to be an instruction to upgrade firmware of a specified detector 150, the external control module 110 (message storage and transmission part 113) packages and transmits a firmware upgrade program for the specified detector 150 to the data transmission and control module through the fifth-type interface, and the data transmission and control module configures the firmware upgrade program to the specified detector 150 through a first-type interface communicatively connected with the specified detector 150.

(2-4) If the control instruction is determined to be an instruction to upgrade firmware of the data transmission and control module, the external control module 110 (message storage and transmission part 113) packages and transmits a firmware upgrade program for the data transmission and control module to the data transmission and control module through the fifth-type interface, and data transmission and control module downloads and configures the firmware upgrade program for the data transmission and control module.

(3) Operating condition monitoring and processing: the data transmission and control module receives data of real-time parameters of the operating condition of the detector 150 or the data transmission and control module 120 transmitted by the operating condition monitoring and control module through the third-type interface in real time, the data is transmitted to the performance and operating condition parameter configuration part 115 of the external control module 110 through the fifth-type interface, the performance and operating condition parameter configuration part 115 configures operating parameters of the detector 150 or the data transmission and control module 120 dynamically based on performance and parameter models of the detector 150 or the data transmission and control module 120, so that the detector 150 or the data transmission and control module 120 are in optimum operating conditions. The performance and parameter models are obtained by multiple simulation experiments, and stored in the external control module 110 in advance.

(4) Operating environment condition monitoring and processing: the data transmission and control module receives data of real-time parameters of the operating environment of the detector 150 or the data transmission and control module 120 transmitted by the operating environment monitoring module through the third-type interface, the data is reported to performance and environment parameter configuration part 114 of the external control module 110 through the fifth-type interface, the performance and environment parameter configuration part 114 configures operating parameters of the detector 150 or the data transmission and control module 120 dynamically based on performance and parameter models, so that the detector 150 and the data transmission and control module 120 are in optimum operating conditions. The performance and environment parameter models are obtained by multiple simulation experiments, and stored in the external control module 110 in advance.

Figure 4:
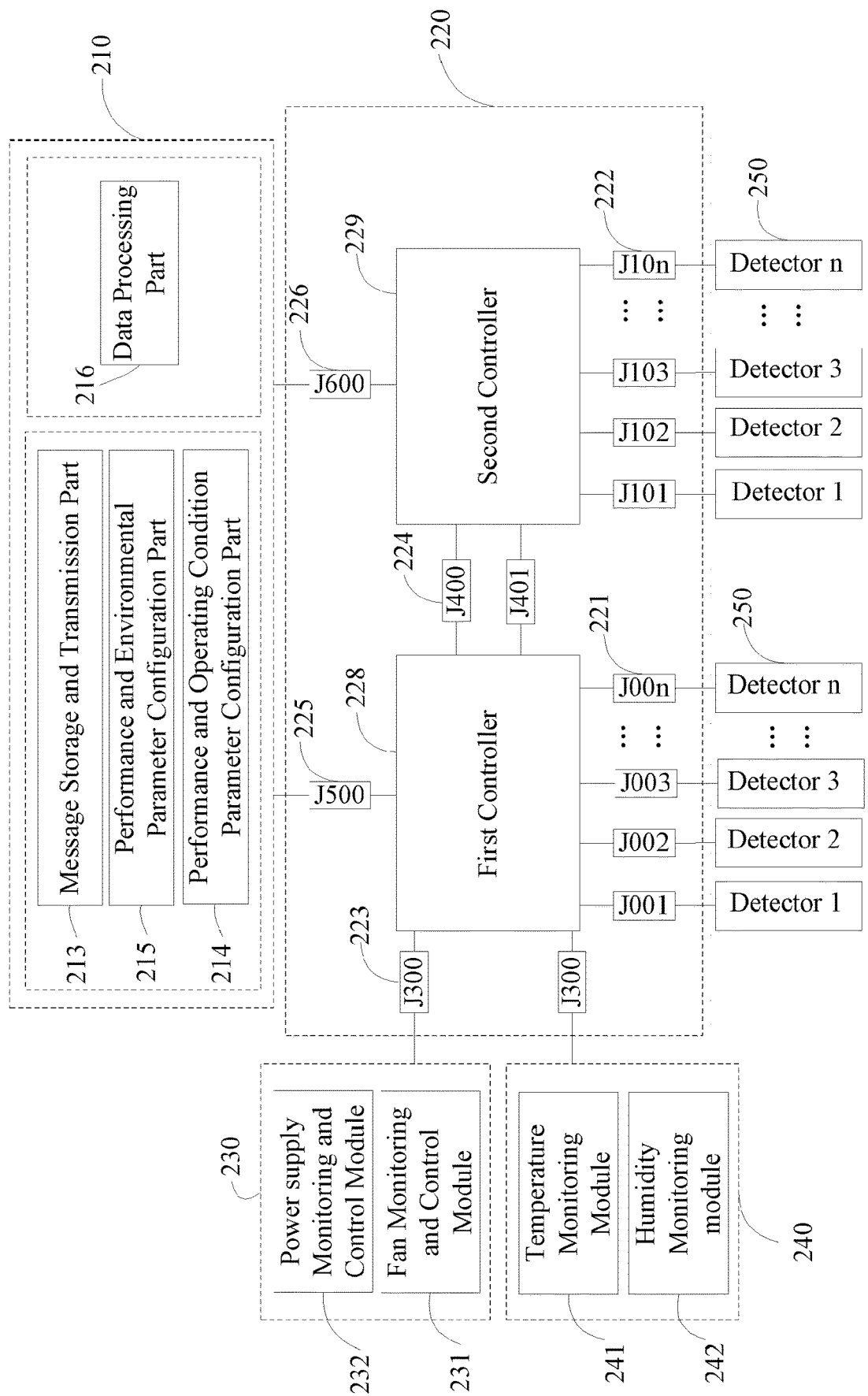
FIG. 4 is a structural schematic diagram illustrating an intelligent control system for a detector according to a second embodiment of the present disclosure.
Figure 5:
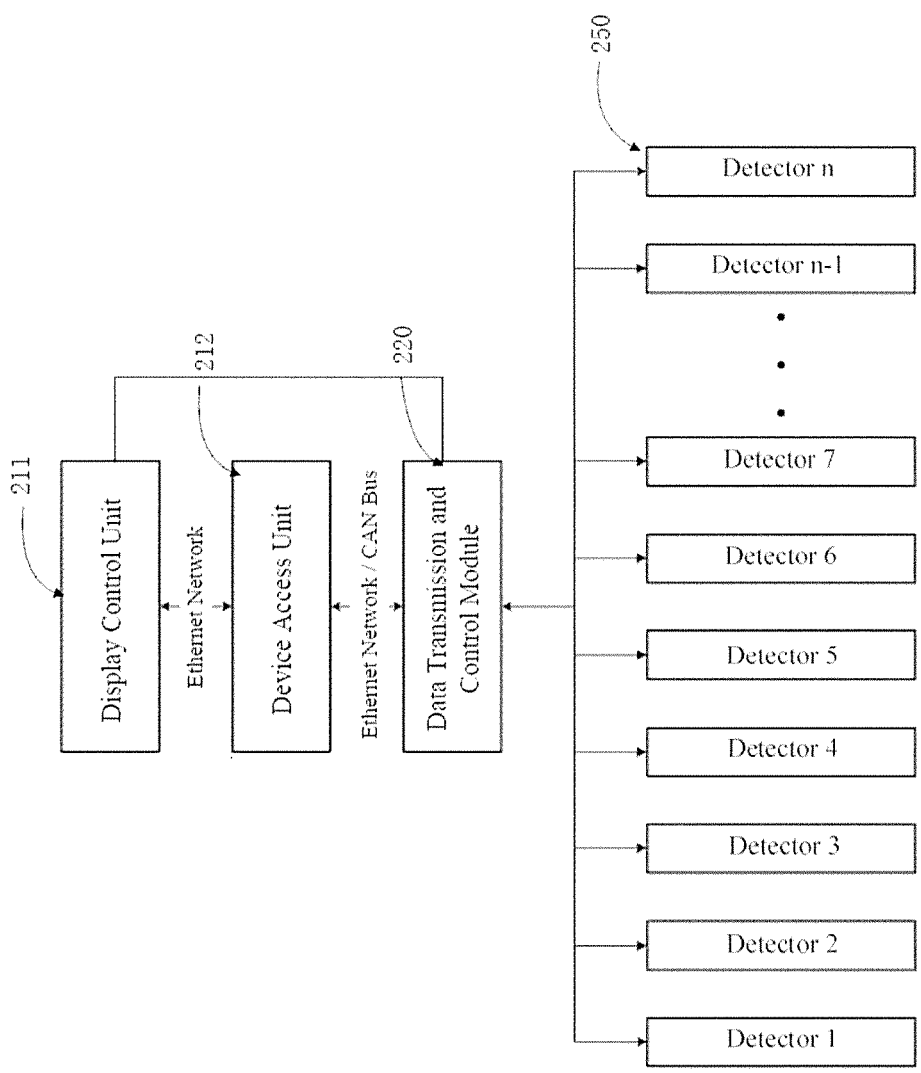
FIG. 5 is a schematic diagram illustrating communication connection relations of the embodiment in FIG. 3.

In a second embodiment, as shown in FIGS. 4 and 5, an intelligent control system for a detector is provided, including a communicated external control module 210, and at least one group of a data transmission and control module 220, an operating condition monitoring and control module 230 and an operating environment monitoring module 240.

The external control module 210 is configured to transmit control messages to the detector 250 and the data transmission and control module 220, and receive and process original data/preprocessed data of the detector and feedback messages transmitted by the data transmission and control module 220. The external control module 210 includes a control display unit 211 and a device access unit 212 communicatively connected with the control display unit 211. In this embodiment, the control display unit 111 is in a separated structure, including a third controller and a fourth controller separately. The third controller includes a message storage and transmission part 213, a performance and environmental parameter configuration part 214, and a performance and operating condition parameter configuration part 215, and the fourth controller includes the data processing part 216. The message storage and transmission part 213 is configured to control the upgrade and parameter configuration of the detector 250 and the data transmission and control module 220. The performance and environmental parameter configuration part 214 and the performance and operating condition parameter configuration part 215 are configured to configure the detector 250 and the data transmission and control module 220 dynamically. The data processing part 216 is configured to process the data of the detector transmitted by the data transmission and control module 220. Alternatively, the control display unit 211 can be in an integrated structure as the first embodiment.

The third controller and the fourth controller are in IP communication with the device access unit 212. The device access unit 212 is in IP or CAN bus communication with the data transmission and control module 220. Each module can be communicated to one another based on IP or CAN communication. As a standard component in the operating system, the IP and CAN communication is well-arranged with stable and clear external interfaces, so that the whole system has high reliability, low cost and strong commonality in data processing and transmission.

The data transmission and control module 220 includes a first controller 228 for parameter configuration and firmware upgrade, and a second controller 229 for data interaction among the plurality of detectors. The first controller 228 includes one fifth-type interface 225, at least one first-type interface 221, one third-type interface 223 and the ID determination unit. The second controller 229 includes one sixth-type interface and at least one second-type interface. In addition, the first controller and the second controller are further provided with a seventh-type interface 277. The seventh-type interface 227 is an external extension interface to be coupled to a peripheral expansion interface for expansion of RAM and FLASH for the first controller and/or the second controller.

The first controller 228 is separated from the second controller 229. Each of the first controller 228 and the second controller 229 is any one of MCU, DSP, CPLD and FPGA. A fourth-type interface 224 for data interaction is provided between the first controller 228 and the second controller 229. Each of the first-type interface 221, the second-type interface 222 and the third-type interface 223 may be any one of an RS232 interface, an RS485 interface, an Ethernet interface, a CAN interface, a fiber interface, SPI, I2C, GPIO, and FSMC. The fifth-type interface 225 and the sixth-type interface 226 is in IP or CAN communication with the external control module 210, so the fifth-type interface 125 and the sixth-type interface 126 are Ethernet interfaces or CAN interfaces.

The first controller 228 is configured to parse and process the control messages of the detector 250 and the data transmission and control module 220 transmitted through the fifth-type interface 225, and feed back the information on the detector 250 and the data transmission and control module 220.

The fifth-type interface 225 is communicatively connected with the message storage and transmission part 213 through the device access unit 212, and is configured to query and configure parameters of the detector 250, and upgrade firmware of the detector 250 and the data transmission and control module 220.

The at least one first-type interface 221 is coupled to a plurality of detectors 250 respectively, and configured for the transmission of the control messages and the feedback messages. In this embodiment, the number of the first-type interface 221 is set correspondingly to the number of the plurality of detectors 250 Each detector 250 is communicatively connected with the data transmission and control module 220 through one first-type interface 221.

The ID determination unit is communicatively connected with the external control module 210 through the fifth-type interface 225, and is configured to inform and determine an ID of the data transmission and control module 220 to the external control module 210, to prevent the control instruction from being transmitted improperly.

The at least one third-type interface 223 is a reserved control interface, and configured for the access and processing of the operating condition monitoring and control module 230 and the operating environment monitoring module 240.

The operating condition monitoring and control module 230 is configured to monitor operating condition parameters of the detector 250 and the data transmission and control module 220, and transmit the operating condition parameters to the first controller 228. The fifth-type interface 225 of the first controller 228 is communicatively connected with the performance and operating condition parameter configuration part 215 of the third controller through the device access unit 212, to configure the operating parameters of the detector 250 and the data transmission and control module 220 dynamically, or drive the operating condition monitoring and control module 230 to adjust the operating condition of the device to be monitored, so that both the detector 250 and the data transmission and control module 220 are in optimum operating conditions. In this embodiment, the operating condition monitoring and control module includes a fan monitoring and control module 231 or a power supply monitoring and control module 232, or a combination of both.

One end of the fan monitoring and control module 231 is coupled to a plurality of fans, and the end other of the fan monitoring and control module 231 is coupled to the first controller 228 through one third-type interface to be driven by the intelligent control system to adjust rotational speeds of the plurality of fans respectively, so that the operating temperatures of the detector 250 and the data transmission and control module 220 are adjustable. When the intelligent control system, i.e., the performance and operating condition parameter configuration part 215 determines that the operating temperature is too high, a control instruction may be transmitted to increase the rotational speeds of the fans, and when the performance and operating condition parameter configuration part 215 determines that the operating temperature is too low, a control instruction may be transmitted to decrease the rotational speeds of the fans. If the first controller 228 has a sufficiently powerful function, the performance and operating condition parameter configuration part 215 may also be provided in the first controller 228.

One end of the power supply monitoring and control module 232 is coupled to a power supply of the detector 250 or the data transmission and control module 220, and the other end of the power supply monitoring and control module 232 is coupled to the first controller 228 through one third-type interface to be driven by the intelligent control system to configure output parameters of the power supply dynamically. The intelligent control system, i.e., the performance and operating condition parameter configuration part 215 receives the real time operating voltages of the detector 250 and the data transmission and control module 220 transmitted by the power supply monitoring and control module 232 through the fifth-type interface. The performance and operating condition parameter configuration part 215 is provided with a performance and operating condition model. The performance and operating condition model is obtained by multiple simulation experiments, for determining the operation condition of the detector in different voltages. If the performance and operating condition parameter configuration part 215 determines that operating voltage is abnormal, the performance and operating condition parameter configuration part 215 may transmit a control instruction to the power supply monitoring and control module 232. The power supply monitoring and control module 232 may analyze the control instruction, and adjust the output of the power supply of the detector 250 and the data transmission and control module 220, so that the operating voltage of the detector 250 and the data transmission and control module 220 is in a normal condition.

The operating environment monitoring module 240 is configured to monitor the operating environment parameters of the detector 250 and the data transmission and control module 220 in real time, and transmit the real time operating environment parameters to the first controller 228 through the third-type interface. The fifth-type interface of the first controller 228 is communicatively connected with the performance and operating condition parameter configuration part 215 through the device access unit 212, to timely warn the operator to process the abnormal condition of the environment parameter, so that the detector 250 and the data transmission and control module 220 are always in optimum operating conditions. In this embodiment, the operating environment monitoring module 240 includes an operating temperature monitoring module 241 or an environment humidity monitoring module 242, or a combination of both.

One end of the operating temperature monitoring module 241 is communicatively connected with a temperature sensing unit, and the other end of the operating temperature monitoring module 241 is coupled to the first controller 218 through one third-type interface to monitor operating temperature information of the detector 250 or the data transmission and control module 220 in real time. One end of the environment humidity monitoring module 242 is coupled to a humidity sensing unit, and the other end of the environment humidity monitoring module 242 is coupled to the data transmission and control module 220 through one third-type interface 223 to monitor humidity information of an operating environment where the detector 250 or the data transmission and control module 220 is in real time.

The second controller 229 is configured to receive, acquire and transmit the original data of the detector, or is configured to receive, acquire and preprocess the original data of the detector 250 and transmit the preprocessed data. The second controller 229 performs a preprocessing step between acquisition and transmission, and the preprocessing step includes one or more of screening, filtering, algorithm implementation, marking, encapsulation, packetization, caching and packet sending. The at least one second-type interface 222 is coupled to the plurality of detectors 250 respectively, and configured for the transmission of the original data of the detector 250. The sixth-type interface 226 is communicatively connected with the external control module 210, and configured for the transmission of the original data/preprocessed data of the detector 250. In this embodiment, the number of the second-type interface 222 is set correspondingly to the number of the plurality of detectors 250. Each detector 250 is communicatively connected with the data transmission and control module 220 through one second-type interface 222.

The intelligent control system will be further described, provided that the first controller 228 is a MCU, the second controller is a FPGA, the fifth-type interface 225 and the sixth-type interface 226 are CAN interfaces, and the third controller is a server.

The MCU is communicatively connected with the FPGA through the fourth-type interface. The fourth interface includes a J401 interface and a J402 interface. The J401 interface is a PS mode configuration interface, and configured for the transmission of the firmware configuration data between the MCU and FPGA. The J402 interface is selected from any one of RS232 interface, SPI, I2C, GPIO, FSMC, EPI, local bus, and other short distance data transmission interfaces, and configured for the transmission of transaction data between the MCU and the FPGA.

When the first controller 228 is a MCU, it is based on an ARM+Linux platform having a hardware architecture including an ARM with a Cortex M4 core and a plug-in SRAM to form a minimum system, and having a software system with a SafeRTOS real-time operating system. The first controller 228 can achieve firmware programming, on-line upgrade, configuration, and data flow monitoring of the FPGA, operating parameter configuration and operating condition monitoring of the detector, data storage and analysis of the sensing unit, communication control of the network port, CAN bus and USB interface of the interface unit, control instruction and sensing information interaction with the detector, and control instruction and data interaction with the third controller. In addition, the first controller 228 can provide a platform based on SafeRTOS and Linux systems under the ARM hardware architecture, to provide the user with SDK and API, and to configure the function of the detector according to actual requirements.

When the second controller is a FPGA, a data acquisition and processing center based on FPGA, SRAM, DDR and PHY can acquire and preprocess the data of the detector as needed, includes screening, filtering, algorithm implementation, marking, encapsulation, packetization, caching, packet sending and other data operations.

The data preprocessing system uses a FPGA as a core. Different data acquisition processes, different data processing mechanisms and different data output formats can be implemented inside the FPGA according to the requirements of the user's applications. For the data input and data output interfaces, a gigabit network interface can ensure an adequate data channel. The FPGA can achieve the processing and transmission if the UDP messages output from the detector, which is loaded by an external MCU. The configuration file of the FPGA is stored in a FLASH. When the system is powered up, the MCU may read configuration data from the FLASH to load the FPGA. The FPGA is coupled to an external PHY chip through a RGMII interface. The FPGA implements a multi-port MAC inside, to analyze the Ethernet UDP data in the MAC layer, while the UDP message is compressed according to a certain algorithm to reduce the traffic at the output of the system and reduce calculating pressure of a back-end server. Since the system needs to combine multi-path data into one path output, the FPGA needs to set a appropriate buffer to ensure data of each path is not lost and the performance of the system is optimized. The data output from the system can be transmitted in a multi-path input data polling mode or in other mode of combining multi-path input into one path output. Considering the improvement of the computation speed of the detection, the FPGA is coupled to an external DDR which is easy to be expanded as a cache of the algorithm implemented in the FPGA. In addition, the system also provide a JTAG interface for FPGA online debugging, a LED test lamp and power control pins.

Based on the user's usage scenarios, the server may determine the operating mode, parameters and firmware of each detector, and operating parameters of the device access unit 212 independently. The server may transmit configuration parameters of each detector 250 and firmware of the device access unit 212 to the device access unit 212 through Ethernet communication. The device access unit 212 may store all the configuration and firmware transmitted by the server in a local file system. All the data transmission and control module 220 are communicatively connected with the device access unit 212 through the CAN bus. The device access unit 212 may transform the CAN communication into Ethernet communication. The server may acquire the operating mode and parameters of each detector in an Ethernet to CAN bus form, to determine whether it is required to upgrade the detector. If the detector is required to be upgraded, the operating mode, parameters and firmware of the detector is transmitted to the detector module to be upgraded in an Ethernet to CAN bus form. When the transmission is finished, the control unit of the detector implements the upgrade by itself, to complete the upgrade of the firmware of the detector, and to achieve different detection functions.

As shown in FIG. 6, a control method for the intelligent control system in the above embodiment is provided, including the following steps:

(1) initialization and self-checking, wherein the third controller drives the first controller 228 to perform initialization and self-checking, after receiving an initial instruction, and when the initialization is successful, the second controller 229 begins to acquire and preprocess the original data of the plurality of detectors 250 through the second-type interface, and the second controller 229 transmits the preprocessed original data to the fourth controller through the sixth-type interface, for image reconstruction;

the initialization and self-checking in the step (1) includes: after powering up the data transmission and control module 120, (1-1) configuring, by the first controller 228, clocks and peripherals of the data transmission and control module independently;

(1-2) loading, by the second controller 229, a data preprocessing program for subsequent data acquisition of the plurality of detectors 250;

(1-3) configuring and detecting, by the first controller 228, an operating voltage of the detector 250 to successfully power up the detector 250 after the second controller 229 has completed the loading, the first controller 228 continuing to configure initial operating parameters of the detector 250 so that the detector 250 begins to operate and transmit data, wherein the initial parameters of the detector are recorded and analyzed operating conditions of the detector, and an optimal operating condition for the detector can be obtained through big data analysis; and (1-4) transmitting, data from the plurality of detectors 250, to the fourth controller through the sixth-type interface 226, after being acquired and preprocessed by the second controller 229.

(2) During the acquisition and transmission of the data of the detector 250, the intelligent control system can achieve the on-line upgrade of the detector according to user requirements, and change the firmware independently to achieve different detection modes, parameter configuration of the detector, performance correction, and full monitoring of the detector, according to different applications.

The user can input a control instruction to the third controller according to specific requirements. The intelligent control system according to the present disclosure can combine the CAN bus and Ethernet network to build a All-IP management architecture, so that all the detectors are intelligently modularized into separate on-line units. Through a centralized-control center, the user can access, control, and interact with an intelligent module of the detector, collect and acquire state information of the detector, record and analyze local data, and download and update firmware to change the function and process of the detector for different applications, and to change the firmware to achieve different detection modes.

(2-1) If the third controller determines that the control instruction is an inquiry instruction for a parameter of a specified detector 250, the message storage and transmission part 213 transmits the inquiry instruction to the first controller 228 through the fifth-type interface 225, the first controller 228 queries the parameter of the specified detector 250 through the first-type interface 221 communicatively connected with the specified detector 250 after receiving the inquiry instruction, and the first controller 228 feeds back information on the parameter to the third controller to display and process.

(2-2) If the third controller determines that the control instruction is an instruction to configure a parameter of a specified detector 250, the message storage and transmission part 213 transmits information on the parameter of the specified detector 250 to the first controller 228 through the fifth-type interface 225, the first controller 228 downloads and transmits the information on the parameter to the specified detector 250 through a first-type interface communicatively connected with the specified detector 250, and the specified detector 250 configures the parameter based on the information on the parameter.

(2-3) If the third controller determines that the control instruction is an instruction to upgrade firmware of a specified detector 250, the message storage and transmission part 213 packages and transmits a firmware upgrade program for the specified detector 250 to the first controller 228 through the fifth-type interface 225, and the data transmission and control module configures the firmware upgrade program to the specified detector 250 through a first-type interface 221 communicatively connected with the specified detector 250.

(2-4) If the third controller determines that the control instruction is an instruction to upgrade firmware of the data transmission and control module, the message storage and transmission part 213 packages and transmits a firmware upgrade program for the data transmission and control module to the data transmission and control module through the fifth-type interface, and data transmission and control module downloads and configures the firmware upgrade program for the data transmission and control module.

In the step (2-4), the external control module 210 transmits the firmware upgrade program for the data transmission and control module through the fifth-type interface includes:
(2-4-1) if the message storage and transmission part 213 determines the control instruction is a firmware upgrade instruction for the first controller 228, the message storage and transmission part 213 transmits messages about a firmware upgrade program for the first controller 228 and the firmware upgrade instruction for the first controller 228 to the first controller 228 through the fifth-type interface 225, and the first controller 228 downloads and configures the firmware upgrade program for the first controller 228 after receiving and analyzing the messages; and (2-4-2') if the external control module 210 determines the control instruction is a firmware upgrade instruction for a second controller 229, i.e., a firmware upgrade instruction for the FPGA, the external control module 210 transmits message about a firmware upgrade program for the second controller 229 and the firmware upgrade instruction for the second controller 229 to the first controller 228 through the fifth-type interface 225, and the first controller 228 downloads the firmware upgrade program for the second controller 229 after receiving and analyzing these messages, and transmits the firmware upgrade program for the second controller 229 to the second controller 229 for configuration through the J401 interface.

When the second controller 229 is any other processing unit other than FPGA, the upgrade of the second controller 229 can be performed by the following step: (2-4-2') if the external control module 210 determines the control instruction is a firmware upgrade instruction for a second controller 229, the external control module 210 transmits message about a firmware upgrade program for the second controller 229 and the firmware upgrade instruction to the second controller 229 through a sixth-type interface 226, and the second controller 229 downloads and configures the firmware upgrade program for the second controller 229 after receiving and analyzing the message.

Each traditional nuclear detector generally has a controller with fixed configuration parameters including voltage, gain and threshold. In contrast, the intelligent control system according to the present disclosure can not only configure the detector based on an optimal configuration file in the step (1), but also monitor the operating condition of the detector 250 and the data transmission and control module 220 in real time, and change the configuration parameters of the detector 250 and the data transmission and control module 220 based on the performance and operating parameter model, so that the detector and the system are always in optimum operating conditions.

(3) Operating condition monitoring and processing: the data transmission and control module receives data of real-time parameters of the operating condition of the detector 150 or the data transmission and control module 120 transmitted by the operating condition monitoring and control module through the third-type interface in real time, the data is transmitted to the performance and operating condition parameter configuration part 215 of the external control module 210 through the fifth-type interface, the performance and operating condition parameter configuration part 215 configures operating parameters of the detector 150 or the data transmission and control module 120 dynamically based on performance and parameter models of the detector 150 or the data transmission and control module 120, and the performance and operating condition parameter configuration part 215 drives the operating condition monitoring and control module 130 to adjust the operating parameters of the device to be monitored dynamically, so that the detector 250 or the data transmission and control module 220 are in optimum operating conditions.

In addition, the environment parameters of the detector are monitored in real time, and the configuration parameters of the detector 250 and the data transmission and control module 220 are changed dynamically based on the performance and environment parameter model, so that detector and the system are always in optimum operating conditions.

(4) Monitoring and processing operating environment condition of the detector 250 and the data transmission and control module 220: the first controller 2288 of the data transmission and control module 220 receives data of real-time parameters of the operating environment of the detector 250 or the data transmission and control module 220 transmitted by the operating environment monitoring module 240 through the third-type interface, the data is reported to performance and environment parameter configuration part 214 of the third controller through the fifth-type interface, the performance and environment parameter configuration part 214 configures operating parameters of the detector or the data transmission and control module dynamically based on performance and parameter models of the detector or the data transmission and control module, so that the detector and/or the data transmission and control module are in optimum operating conditions.

In the third embodiment, a PET device is provided, including a detector, an auxiliary system and an intelligent control system for the detector. The auxiliary system is communicatively connected with the external control module to be driven by the external control module. The auxiliary system includes a calibration system, a machine position control system, a power distribution system, and a data transmission system. In this embodiment, the calibration system, the machine position control system, the power distribution system and the data transmission system are communicatively connected with the external control module through the Ethernet interfaces respectively, to control their operations as need. All detectors on the PET device are communicatively connected with the data transmission and control module, and specifically, each data transmission and control module is communicatively connected with a certain number of detectors for the control of the detectors on the PET device. Each data transmission and control module is communicatively connected with a plurality of detectors through the second-type interfaces, and configured for the acquisition and transmission of the original data of the detectors on the PET device.

A PET device including the intelligent control system in the second embodiment will be described as below.

Generally, the external control module cooperates with the calibration system firstly, to perform calibration of the whole device, including detector sensitivity calibration and detector time resolution calibration. This process may be performed once a month. Then the data transmission and control module may be powered up for initialization, so that data transmission and control module is ready for the subsequent data acquisition and transmission. Finally, the external control module cooperates with the machine position control system to transfer the person to be detected to a specified position, so that the PET scan can be performed.

The data transmission and control module includes a first controller 228 and a second controller 229. Preferably, the first controller 228 is based on an ARM+Linux platform having a hardware architecture including an ARM with a Cortex M4 core and a plug-in SRAM to form a minimum system to control multi-patch programmable voltage module and combine voltage, current, temperature and humidity sensors. The first controller 228 has a SafeRTOS real-time operating system to provide the user with API interfaces. The first controller 228 can achieve the following three aspects: (1) proving basic requirements for the normal operation of the detector 250: multi-patch power configuration, and parameter configuration of the detector 250; (2) providing effective operation security for the detector 250: real-time monitoring; and (e) proving stable operation: correcting the detector 250 to be in optimum performance based on monitoring information and a known performance model of the detector.

The second controller 229 uses a FPGA as a core. Different data acquisition processes, different data processing mechanisms and different data output formats can be implemented inside the FPGA according to the requirements of the user's applications. For the data input and data output interfaces, a gigabit network interface can ensure an adequate data channel. The design of the second controller 229 includes an algorithm platform, a data processing flow and a data output structure. (1) Algorithm platform: it provides an algorithm package in a fixed mode according to the user's application, and it also provides a user-defined algorithm function. In the area of PET, the calculation of position, time and energy can be achieved, and the setting of the energy window can be achieved. (2) data processing flow: it provides a specific data processing flow according to the user's requirements, for example, energy calculation, energy window screening, and fixed size package transmission in the area of PET. (3) data output structure: it provides encapsulation, marking and data transmission for user-defined format data packages. It can implement standard format (such as TCP, UDP and CAN) data packages and various user-defined format data packages.

The first controller 228 operates with the second controller 229 to achieve the dynamic maintenance of the user-defined firmware. The dynamic maintenance of the user-defined detector firmware is used to implement the on-line upgrade of the detector. The firmware can be changed to implement different detection modes according to different applications. It includes: (1) CAN bus control of the control info nation: each data transmission and control device at a multi-node detector network can be used as a separate unit coupled to the CAN bus, to facilitate the control of the array or group of detectors. The CAN bus allow information bidirectional transmission between the external control device and the data transmission and control device. The firmware of the detector can be written into the processing and control module according to a fixed protocol, to change the program of the ARM and FPGA to achieve various functions of the detector. (2) Networked access to the array of the detectors: when a plurality of detectors made up an array, all the detectors can be accessed and controlled through the CAN bus and CAN bus switches. (2) Automatic loading of the firmware (including ARM and FPGA): the appropriate firmware can be programmed into the ARM platform, and the ARM can load the FPGA dynamically to implement a customized algorithm module and the data processing flow of the detector, to complete the firmware upgrade of the whole detector, and to change or customize the usage of the detector according to application requirements.

The above are preferred embodiments of the invention described in detail, and should not be deemed as limitations to the scope of the present invention. It should be noted that variations and improvements will become apparent to those skilled in the art to which the present invention pertains without departing from its spirit and scope. Therefore, the scope of the present disclosure is defined by the appended claims.

What is claimed is:

1. An intelligent control system for a detector, comprising an external control module and at least one data transmission and control module communicatively connected to a plurality of detectors respectively, wherein:

the external control module is communicatively connected with the each data transmission and control module respectively to be configured to transmit control messages to the detector and the data transmission and control module communicated to the detector, and receive and process feedback messages from the detector and the data transmission and control module, and original data or preprocessed data of the detector transmitted by the data transmission and control module;

the each data transmission and control module is coupled to a plurality of detectors, and comprises a processing unit, a data preprocessing unit, at least one first-type interface, at least one second-type interface, a fifth-type interface and a sixth-type interface;

the fifth-type interface is communicatively connected with the external control module, and configured to transmit the control messages and the feedback messages of the detector and the data transmission and control module;

the processing unit is configured to receive, parse, process, and transmit the control messages and the feedback messages of the detector and the data transmission and control module;

the at least one first-type interface is coupled to a plurality of detectors, and configured for the transmission of the control messages and the feedback messages of the detector;

the at least one second-type interface is coupled to the plurality of detectors, and configured for the transmission of the original data of the detector;

the data preprocessing unit is configured to acquire, receive and transmit the original data of the detector, or the data preprocessing unit is configured to acquire, receive and preprocess the original data of the detector and transmit the preprocessed data of the detector; and the sixth-type interface is communicatively connected with the external control module, and configured for the transmission of the original data of the detector or the preprocessed data of the detector.

2. The intelligent control system of claim 1, further comprising at least one operating condition monitoring and control module and/or operating environment monitoring module for the detector and/or the data transmission and control module, wherein the data transmission and control module is provided with at least one third-type interface, the at least one third-type interface is a reserved control interface, each data transmission and control module is communicatively connected with one operating condition monitoring and control module and/or operating environment monitoring module through the third-type interface, and the intelligent control system configures operating parameters of the detector and/or the data transmission and control module dynamically based on monitoring information transmitted by the operating condition monitoring and control module and/or operating environment monitoring module.

3. The intelligent control system of claim 2, wherein the operating condition monitoring and control module is a power supply monitoring and control module or a fan monitoring and control module, or a combination of both:

one end of the power supply monitoring and control module is communicatively connected with a power supply of the detector and/or the data transmission and control module, and the other end of the power supply monitoring and control module is coupled to the data transmission and control module through one third-type interface so as to be driven by the intelligent control system to configure output parameters of the power supply dynamically; and one end of the fan monitoring and control module is communicatively connected with a plurality of fans, and the end other of the fan monitoring and control module is coupled to the data transmission and control module through one third-type interface so as to be driven by the intelligent control system to adjust rotational speeds of the plurality of fans respectively.

4. The intelligent control system of claim 1, wherein in the each data transmission and control module, the number of the first-type interfaces and the number of the second-type interfaces correspond to the number of the detectors coupled to the data transmission and control module respectively, and each of the detectors is communicatively connected with the data transmission and control module through one first-type interface and one second-type interface respectively.

5. The intelligent control system of claim 2, wherein the each data transmission and control module comprises a first controller configured for parameter configuration and firmware upgrade, and a second controller configured for data interaction among a plurality of detectors, the first controller comprises the processing unit, one fifth-type interface and at least one first-type interface, the second controller comprises the data preprocessing unit, one sixth-type interface and at least one second-type interface, and the third-type interface is provided on the first controller or the second controller.

6. The intelligent control system of claim 5, wherein the first controller and/or the second controller is provided with a seventh-type interface, and the seventh-type interface is a peripheral expansion interface coupled to a peripheral control unit, and configured for expansion of RAM and FLASH for the first controller and/or the second controller;
 a fourth-type interface is provided between the first controller and the second controller, for data interaction between the first controller and the second controller; and
 the first controller and the second controller include any one of an MCU, a DSP, a CPLD, and an FPGA.

7. The intelligent control system of claim 5, wherein the second controller is a FPGA, the first controller is communicatively connected with the FPGA through a fourth-type interface, the fourth-type interface includes a J401 interface and a J402 interface, the J401 interface is configured for transmission of firmware configuration data between the first controller and the FPGA, and the J402 interface is configured for transmission of transaction data between the first controller and the FPGA;
 the J401 interface is a PS mode configuration interface, the J402 interface is a short distance data transmission interface, the short distance data transmission interface is any one of an RS232 interface, an SPI, an I2C, a GPIO, an FSMC, an EPI, and a local bus; and
 the first controller is an MCU, and the second controller is an FPGA.

8. The intelligent control system of claim 2, wherein the first-type interface, the second-type interface, the third-type interface, the fifth-type interface and the sixth-type interface include an RS232 interface, an RS485 interface, an Ethernet interface, a CAN interface, a fiber interface, SPI, I2C, GPIO, and FSMC.

9. The intelligent control system of claim 1, wherein the external control module includes a control display unit, and at least one device access unit communicatively connected with the control display unit;
 the control display unit comprises a message storage and transmission part for the detector and the data transmission and control module, a performance and environmental parameter configuration part for the detector and/or the data transmission and control module, a performance and operating condition parameter configuration part for the detector and/or the data transmission and control module, and a data processing part for processing, analyzing and storing the original data or preprocessed data of the detector;
 the message storage and transmission part is communicatively connected with the fifth-type interface of each data transmission and control module through the device access unit, and configured to query and configure parameters of the detector, and upgrade firmware of the detector and the data transmission and control module;
 the performance and environmental parameter configuration part is communicatively connected with the fifth-type interface of the each data transmission and control module through the device access unit, and configured to configure operating parameters of the detector and/or the data transmission and control module dynamically;
 the performance and operating condition parameter configuration part is communicatively connected with the fifth-type interface of the each data transmission and control module through the device access unit, and configured to configure operating parameters of the detector and/or the data transmission and control module, and operating parameters of the operating condition monitoring and control module dynamically; and
 the data processing part is communicatively connected with the sixth-type interface of the each data transmission and control module, and configured for data post-processing of the original data and the preprocessed data of the plurality of detectors.

10. The intelligent control system of claim 9, wherein the control display unit and the at least one device access unit, a plurality of device access units, and the at least one device access unit and the data transmission and control module are coupled together through a full-featured IP communication; and
 the control display unit is coupled to the at least one device access unit through a full-featured IP communication, the plurality of device access units are coupled to one another through a full-featured IP communication, and the device access unit is coupled to the data transmission and control module through a CAN bus communication.

11. The intelligent control system of claim 9, wherein the control display unit comprises a third controller and a fourth controller configured independently to each other, the third controller comprises a message storage and transmission part, a performance and environmental parameter configuration part, and a performance and operating condition parameter configuration part, and the fourth controller comprises the data processing part.

12. A control method for an intelligent control system of claim 1, comprising:
 (1) initialization and self-checking, wherein the external control module drives the each data transmission and control module to perform initialization and self-checking after receiving an initial instruction, and the data preprocessing unit transmits data of a plurality of detectors to the data processing part of the external control module through the sixth-type interface, after being acquired and preprocessed by the data processing unit, or directly after being acquired by the data processing unit;

(2) monitoring in real time and determining, by the external control module, a control instruction input by the operator, wherein:

(2-1) if the control instruction is determined to be an inquiry instruction for a parameter of a specified detector, the external control module transmits the inquiry instruction to the data transmission and control module through the fifth-type interface, the processing unit of the data transmission and control module queries the parameter of the specified detector through a first-type interface communicatively connected with the specified detector after receiving and processing the inquiry instruction, and the data transmission and control module feeds back information on the parameter to the external control module to display and process;

(2-2) if the control instruction is determined to be an instruction to configure a parameter of a specified detector, the external control module transmits information on the parameter of the specified detector to the data transmission and control module through the fifth-type interface, the processing unit of the data transmission and control module downloads and transmits the information on the parameter to the specified detector through a first-type interface communicatively connected with the specified detector, and the specified detector configures the parameter based on the information on the parameter;

(2-3) if the control instruction is determined to be an instruction to upgrade firmware of a specified detector, the external control module packages and transmits a firmware upgrade program for the specified detector to the data transmission and control module through the fifth-type interface, and the processing unit of the data transmission and control module configures the firmware upgrade program to the specified detector through a first-type interface communicatively connected with the specified detector; and (2-4) if the control instruction is determined to be an instruction to upgrade firmware of the data transmission and control module, the external control module packages and transmits a firmware upgrade program for the data transmission and control module to the data transmission and control module through the fifth-type interface, and the data transmission and control module downloads and configures the firmware upgrade program for the data transmission and control module.

13. The control method of claim 12, wherein the initialization and self-checking in the step (1) comprises: after powering up the data transmission and control module, (1-1) configuring, by a processing unit, clocks and peripherals of the data transmission and control module independently;

(1-2) loading, by a data preprocessing unit, a data processing program;

(1-3) configuring and detecting, by the processing unit, an operating voltage of the detector to successfully power up the detector, the processing unit configuring initial operating parameters of the detector so that the detector begins to operate and transmit data; and (1-4) transmitting, data from the plurality of detectors, to the data processing part of the external control module through the sixth-type interface, after being acquired and preprocessed by the data preprocessing unit, or directly after being acquired by the data preprocessing unit.

14. The control method of claim 12, wherein in the step (2-4), the external control module transmitting the firmware upgrade program for the data transmission and control module through the fifth-type interface comprises: (2-4-1) if the external control module determines the control instruction is a firmware upgrade instruction for a first controller, the external control module transmits messages about a firmware upgrade program for the first controller and the firmware upgrade instruction for the first controller to the first controller through a fifth-type interface, and the first controller downloads and configures the firmware upgrade program for the first controller after receiving and analyzing the messages; and (2-4-2') if the external control module determines the control instruction is a firmware upgrade instruction for a second controller, the external control module transmits message about a firmware upgrade program for the second controller and the firmware upgrade instruction for the second controller to the first controller through a fifth-type interface, and the first controller downloads the firmware upgrade program for the second controller after receiving and analyzing these messages, and transmits the firmware upgrade program for the second controller to the second controller for configuration through the J401 interface; and alternatively, in the step (2-4), (2-4-1') if the external control module determines the control instruction is a firmware upgrade instruction for a first controller, the external control module transmits a firmware upgrade program for the first controller to the first controller through a fifth-type interface, and the first controller downloads and configures the firmware upgrade program for the first controller; and (2-4-2') if the external control module determines the control instruction is a firmware upgrade instruction for a second controller, the external control module transmits a firmware upgrade program for the second controller to the second controller through a sixth-type interface, and the second controller downloads and configures the firmware upgrade program for the second controller.

15. The control method of claim 12, further comprising a step (3) of monitoring and processing operating condition of the detector and/or the data transmission and control module, comprising:

receiving, by the data transmission and control module in real time through the third-type interface, data of real-time parameters of the operating condition of the detector and/or the data transmission and control module transmitted by the operating condition monitoring and control module, and transmitting the data to a performance and operating condition parameter configuration part of the external control module through the fifth-type interface, the performance and operating condition parameter configuration part configuring operating parameters of the detector and/or the data transmission and control module dynamically based on performance and parameter models of the detector and/or the data transmission and control module to adjust operating parameter of a device to be monitored, or the performance and operating condition parameter configuration part driving the operating condition monitoring and control module to adjust operating parameter of a device to be monitored, so that the detector and/or the data transmission and control module is in an optimum operating condition.

16. The control method of claim 12, further comprising a step (4) of monitoring and processing operating environment condition of the detector and/or the data transmission and control module, comprising: receiving, by the data transmission and control module in real time through the third-type interface, data of real-time parameters of the operating environment of the detector and/or the data transmission and control module transmitted by the operating environment monitoring module, and transmitting the data to a performance and environment parameter configuration part of the external control module through the fifth-type interface, the performance and environment parameter configuration part processing the data of real-time parameters based on performance and parameter models of the detector and/or the data transmission and control module, and configuring operating parameters of the detector and/or the data transmission and control module dynamically, so that the detector and/or the data transmission and control module is in an optimum operating condition.

17. A PET device, comprising a detector, a calibration system, a machine position control system, and a power distribution system, and further comprising an intelligent control system of claim 1, wherein the calibration system, the machine position control system, and the power distribution system are communicatively connected with the external control module respectively so as to be driven by the external control module to operate, each data transmission and control module is communicatively connected with a plurality of detectors through a first-type interface and a second-type interface respectively to control each detector, and acquire and transmit original data of each detector.

18. The intelligent control system of claim 3, the operating environment monitoring module is an operating temperature monitoring module or an environment humidity monitoring module, or a combination of both: one end of the operating temperature monitoring module is communicatively connected with a temperature sensing unit, and the other end of the operating temperature monitoring module is coupled to the data transmission and control module through one third-type interface to monitor operating temperature information of the detector and/or the data transmission and control module in real time; and one end of the environment humidity monitoring module is communicatively connected with a humidity sensing unit, and the other end of the environment humidity monitoring module is coupled to the data transmission and control module through one third-type interface to monitor in real time humidity information of an operating environment of the detector and/or the data transmission and control module.

19. The intelligent control system of claim 4, the data transmission and control module further includes an ID determination unit communicatively connected with the external control module through the fifth-type interface, and the ID determination unit is configured to inform and determine an ID of the data transmission and control module.

20. The intelligent control system of claim 4, the data preprocessing unit is configured to perform a preprocessing step between acquisition and transmission, and the preprocessing step includes one or more of screening, filtering, algorithm implementation, marking, encapsulation, packetization, caching and packet sending.

* * * * *